United States Patent
Park et al.

(10) Patent No.: US 10,362,577 B2
(45) Date of Patent: Jul. 23, 2019

(54) METHOD AND APPARATUS FOR RE-ARRANGEMENT OF GROUP RESOURCE IN WIRELESS COMMUNICATION SYSTEM

(71) Applicant: LG ELECTRONICS INC., Seoul (KR)

(72) Inventors: Seungkyu Park, Seoul (KR);
Seongyun Kim, Seoul (KR);
Hongbeom Ahn, Seoul (KR);
Seungmyeong Jeong, Seoul (KR);
Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 15/513,428

(22) PCT Filed: Dec. 23, 2014

(86) PCT No.: PCT/KR2014/012718
§ 371 (c)(1),
(2) Date: Mar. 22, 2017

(87) PCT Pub. No.: WO2016/047864
PCT Pub. Date: Mar. 31, 2016

(65) Prior Publication Data
US 2017/0311308 A1 Oct. 26, 2017

Related U.S. Application Data

(60) Provisional application No. 62/054,364, filed on Sep. 23, 2014.

(51) Int. Cl.
*H04W 72/04* (2009.01)
*H04W 4/70* (2018.01)
(Continued)

(52) U.S. Cl.
CPC ....... *H04W 72/048* (2013.01); *H04L 41/0893* (2013.01); *H04L 41/0896* (2013.01); *H04W 4/70* (2018.02)

(58) Field of Classification Search
CPC ...... H04W 72/048; H04W 4/70; H04W 4/005
See application file for complete search history.

(56) References Cited

U.S. PATENT DOCUMENTS

2014/0244568 A1 8/2014 Goel et al.

FOREIGN PATENT DOCUMENTS

KR 10-2013-0064676 A 6/2013
KR 10-2014-0095571 A 8/2014
(Continued)

*Primary Examiner* — Ronald B Abelson
(74) *Attorney, Agent, or Firm* — Birch, Stewart, Kolasch & Birch, LLP

(57) ABSTRACT

A method for re-arrangement of a group resource of an M2M device arranged according to a hierarchical tree structure is disclosed in accordance with one embodiment of the present invention. The method is performed by a first M2M device which owns a first group resource, and the method comprises the steps of: receiving, from a second M2M device, a specific request message for the first group resource; determining whether it is necessary to transfer at least one member of the first group resource as a member of a group resource of another M2M device; determining, in order to transfer the at least one member as a member of the group resource of the another M2M device, whether to use a group resource existing in the another M2M device or whether to generate a new group resource in the another M2M device; and if a new group resource is generated in the another M2M device, adding the at least one member as a member of the new group resource, wherein the first group resource is added as a member of the new group resource if the another M2M device is higher than the first M2M device in the hierarchical tree structure, and the new group resource is added as a member of the first group resource if the another M2M device is lower than the first M2M device in the hierarchical tree structure.

12 Claims, 13 Drawing Sheets

(51) Int. Cl.
*H04W 4/00* (2018.01)
*H04L 12/24* (2006.01)

(56) References Cited

FOREIGN PATENT DOCUMENTS

WO  WO 2013/089766 A1  6/2013
WO  WO 2013/180355 A1  12/2013

18 (=9×2) message transmissions are needed using legacy
<group> resource due to movement of member

METHOD AND APPARATUS FOR RE-ARRANGEMENT OF GROUP RESOURCE IN WIRELESS COMMUNICATION SYSTEM

CROSS REFERENCE TO RELATED APPLICATIONS

This application is the National Phase of PCT International Application No. PCT/KR2014/012718, filed on Dec. 23, 2014, which claims priority under 35 U.S.C. 119(e) to U.S. Provisional Application No. 62/054,364, filed on Sep. 23, 2014, all of which are hereby expressly incorporated by reference into the present application.

TECHNICAL FIELD

The present invention relates to a method of re-distributing a group resource in a wireless communication system and an apparatus therefor.

BACKGROUND ART

As the ubiquitous era has arrived, machine-to-machine (M2M) communication has attracted much attention. M2M communication technology is under study in many standardization organizations such as TIA, ATIS, ETSI, and oneM2M. In an M2M environment, M2M devices or servers may be hierarchically arranged and, thus, a group resource is present for more efficient operation. The group resource includes one or more members. If one request is received by the members belonging to the group resource, an entity including the group resource transmits the request to the members and receives responses to the request. Then, the entity merges the responses received from the members into one message and transmits the merged message to an originator. However, if any member of the group moves and is registered in another entity, a group operation through the group resource is not efficiently performed as intended.

In this context, the present invention is intended to provide a method of re-distributing the group resource.

DISCLOSURE

Technical Problem

The present invention provides a procedure for re-distributing a group resource in a wireless communication system.

The technical objects that can be achieved through the present invention are not limited to what has been particularly described hereinabove and other technical objects not described herein will be more clearly understood by persons skilled in the art from the following detailed description.

Technical Solution

According to an embodiment of the present invention, provided herein is a method of re-distributing a group resource of machine-to-machine (M2M) devices arranged according to a hierarchical tree structure. The method is performed by a first M2M device having a first group resource and includes receiving a specific request message for the first group resource from a second M2M device, checking whether to shift at least one member of the first group resource to a member of a group resource of another M2M device is needed; determining whether to use an existing group resource present in the other M2M device or to create a new group resource in the another M2M device in order to shift the at least one member to the member of the group resource of the another M2M device, and if it is determined to create the new group resource in the another M2M device, adding the at least one member to the new group resource as a member, and adding the first group resource to the new group resource as a member if the another M2M device resides at a higher location relative to the first M2M device in the hierarchical tree structure, and adding the new group resource to the first group resource as a member if the another M2M device resides at a lower location relative to the first M2M device in the hierarchical tree structure.

Additionally or alternatively, the specific request message may be targeted at a fan-out resource residing at a lower location of the first group resource.

Additionally or alternatively, the method may further include adding the at least one member to the existing group resource present in the another M2M device if it is determined to use the existing group resource present in the another M2M device.

Additionally or alternatively, the determining may include determining whether a message to be transmitted as a result of the specific request message is transmitted to the second M2M device or a plurality of messages to be transmitted as a result of the specific request message is transmitted to the same M2M device among M2M devices except for the second M2M device.

Additionally or alternatively, the determining may include checking whether the specific request message originates from a group resource of the second M2M device or whether the first group resource includes the group resource of the another M2M device as a member.

Additionally or alternatively, the method may further include deleting the at least one member from the first group resource.

In another aspect of the present invention, provided herein is a machine-to-machine (M2M) device configured to re-distribute a group resource in a wireless communication system including M2M devices arranged according to a hierarchical tree structure. The M2M device has a first group resource and includes an RF unit and a processor configured to control the RF unit. The processor may be configured to receive a specific request message for a first group resource from a first M2M device, check whether to shift at least one member of the first group resource to a member of a group resource of a specific M2M device is needed, determine whether to use an existing group resource present in the specific M2M device or to create a new group resource in the specific M2M device in order to shift the at least one member to the member of the group resource of the specific M2M device, and if it is determined to create the new group resource in the specific M2M device, add the at least one member to the new group resource as a member. If the specific M2M device resides at a higher location relative to the M2M device in a hierarchical tree structure, the processor may be configured to add the first group resource to the new group resource as a member, and if the specific M2M device resides at a lower location relative to the M2M device in the hierarchical tree structure, the processor may be configured to add the new group resource to the first group resource as a member.

Additionally or alternatively, the specific request message may be targeted at a fan-out resource residing at a lower location of the first group resource.

Additionally or alternatively, if it is determined to use the existing group resource present in the specific M2M device, the processor may be configured to add the at least one member to the existing group resource.

Additionally or alternatively, the processor may be configured to determine whether a message to be transmitted as a result of the specific request message is transmitted to the first M2M device or a plurality of messages to be transmitted as a result of the specific request message is transmitted to the same M2M device among M2M devices except for the second M2M device in order to determine whether to shift the at least one member to the member of the group resource of the specific M2M device is necessary.

Additionally or alternatively, the processor may be configured to check whether the specific request message originates from a group resource of the first M2M device or whether the first group resource includes the group resource of the specific M2M device as a member in order to determine whether to use the existing group resource present in the specific M2M device or to create the new group resource in the specific M2M device.

Additionally or alternatively, the processor may be configured to delete the at least one member from the first group resource.

The above technical solutions are merely some parts of the embodiments of the present invention and various embodiments into which the technical features of the present invention are incorporated can be derived and understood by persons skilled in the art from the following detailed description of the present invention.

Advantageous Effects

According to an embodiment of the present invention, an operation for a group resource in a wireless communication system can be efficiently performed.

The effects that can be achieved through the present invention are not limited to what has been particularly described hereinabove and other advantages of the present invention will be more clearly understood by persons skilled in the art from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
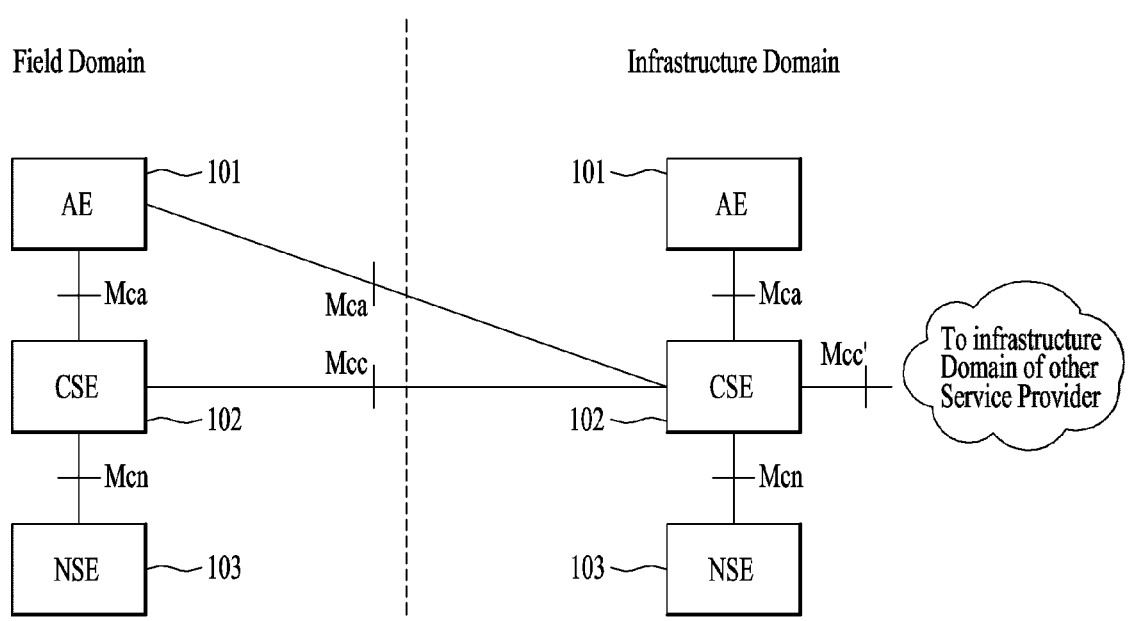
FIG. 1 illustrates a functional structure of an M2M communication system.

FIG. 1 illustrates the architecture of an M2M communication system. Each entity will now be described.

Application entity (AE, 101-*a* or 101-*b*): Application entity provides application logic for end-to-end M2M solutions. Examples of the application entity include fleet tracking application, remote blood sugar monitoring application, remote power metering and controlling application.

Common service entity (CSE, 102*a* or 102-*b*): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103-*a* or 103-*b*): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Men reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
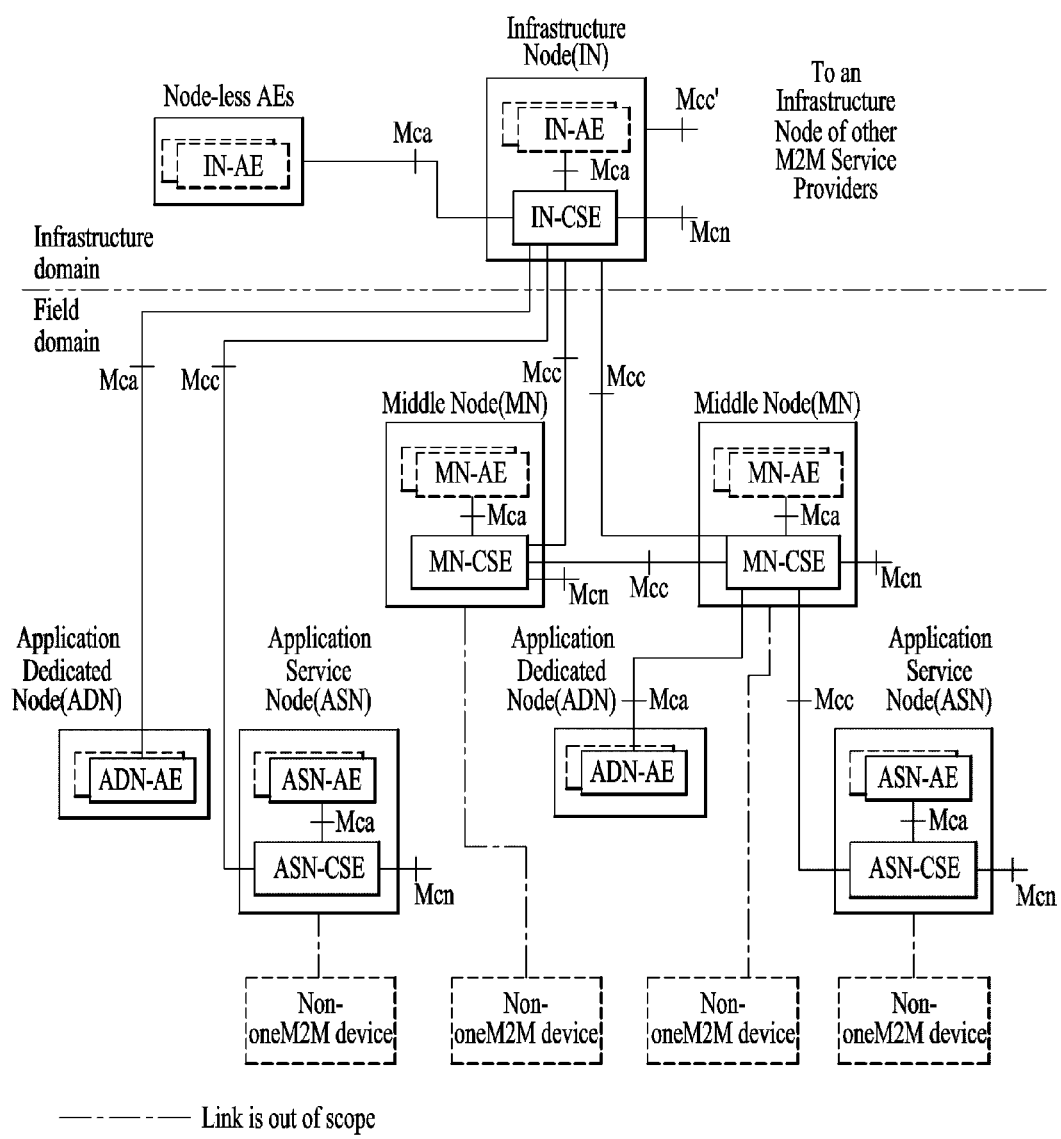
FIG. 2 illustrates a configuration supported by an M2M communication system based on an M2M functional structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;

one or more middle nodes (MNs); and one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or one or more application service nodes.

The IN may communicate with one or more ADNs over one or more Mca reference points.

Figure 3:
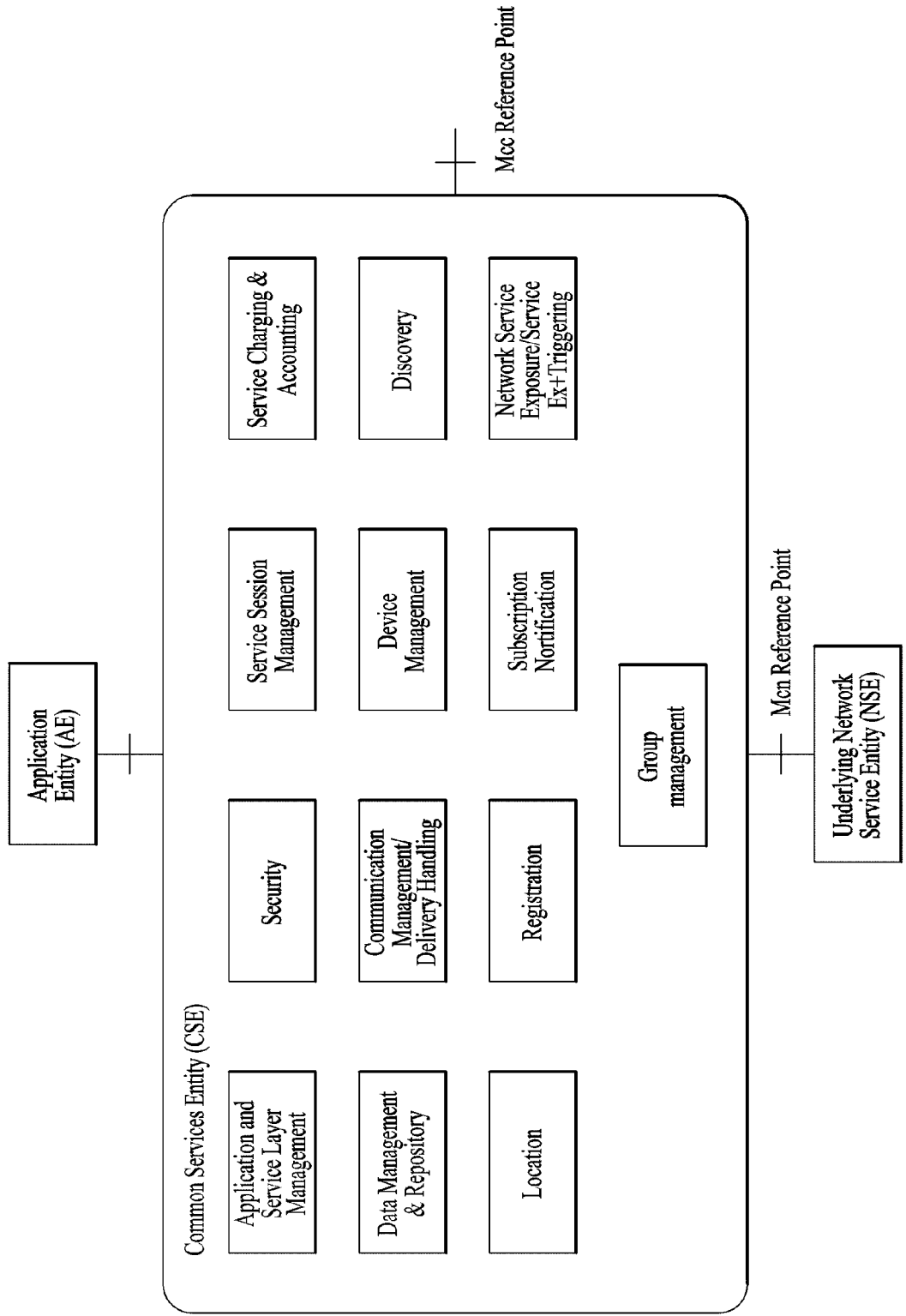
FIG. 3 illustrates a common services function provided by an M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways.

Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

Figure 4:
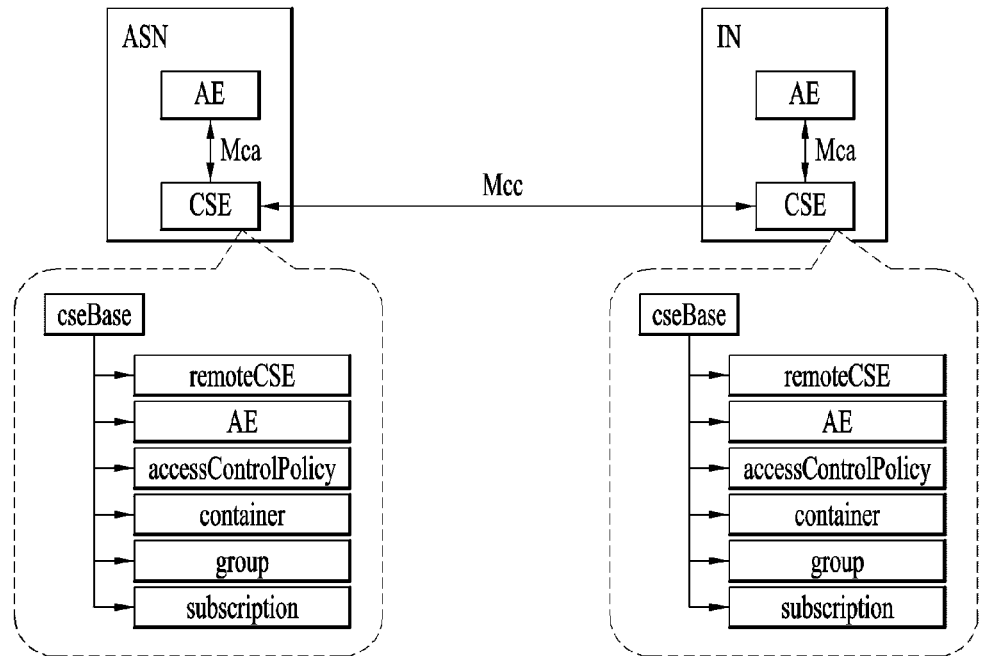
FIG. 4 illustrates resource structures in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
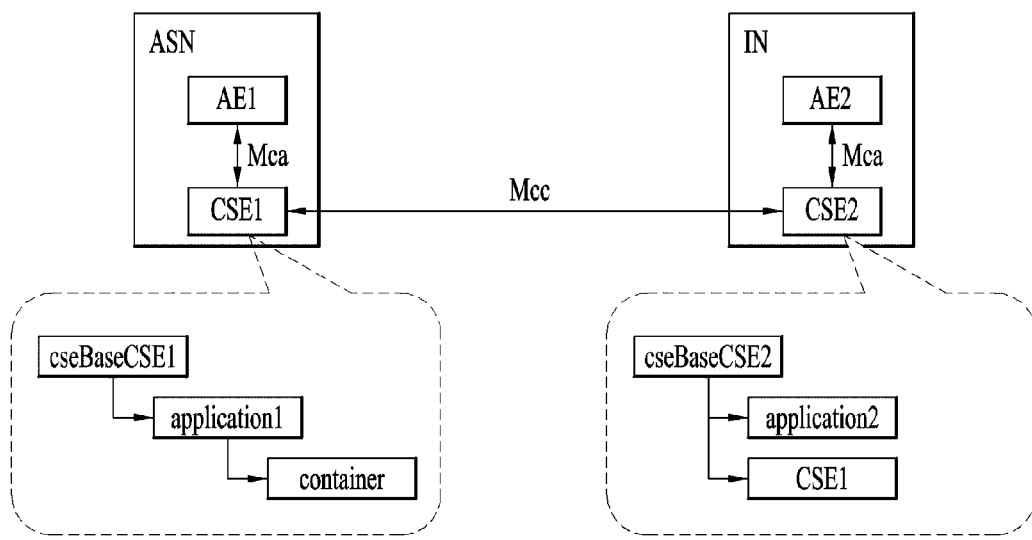
FIG. 5 illustrates resource structures in an M2M application service node (e.g., an M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

Address System of M2M Radio Communication System

In an M2M wireless communication system implemented according to the present invention, a request message and a response message may indicate a target CSE at which the message should finally arrive and a CSE by which the message has first been transmitted, using parameters "to" and "from", respectively. The parameters "to" and "from" are described below.

"to": A URI of a target resource for a corresponding operation (command)

"from": An identifier representing an originator

The parameter "to" may be represented by one of the following schemes.

A resource is present in a CSE and may be accessed by another entity through Mca, Mcc, and Mcc'. To this end, all resources are addressed by unique URIs and a request message specifies for which resource including a URI a command should be performed. The URI may be represented based on a parent-child relationship between resources. In this case, the names of the resources may be enumerated by distinguishing the names from each other by '/' based on the parent-child relationship. The names of the resources only need to be unique between children of specific parents.

Example 1

"IN-CSEID.m2 m.myoperator.org/CSERoot/myAppX/my-ContainerY."

A resource may be addressed by a URI that does not explicitly indicate the parent-child relationship. In this case, unique names are assigned in a specific CSE to all resources and then the resources need not be addressed in consideration of an actual parent-child relationship between the resources. A hosting CSE (a CSE having the original version of a corresponding resource) needs to resolve a logical location of a target resource in a chain in a resource structure.

Example 2: "IN-CSEID.m2m.myoperator.org/CSE-Root/niyContainerY"

The same container as that of the previous example is directly addressed.

Group Resource

Figure 6:
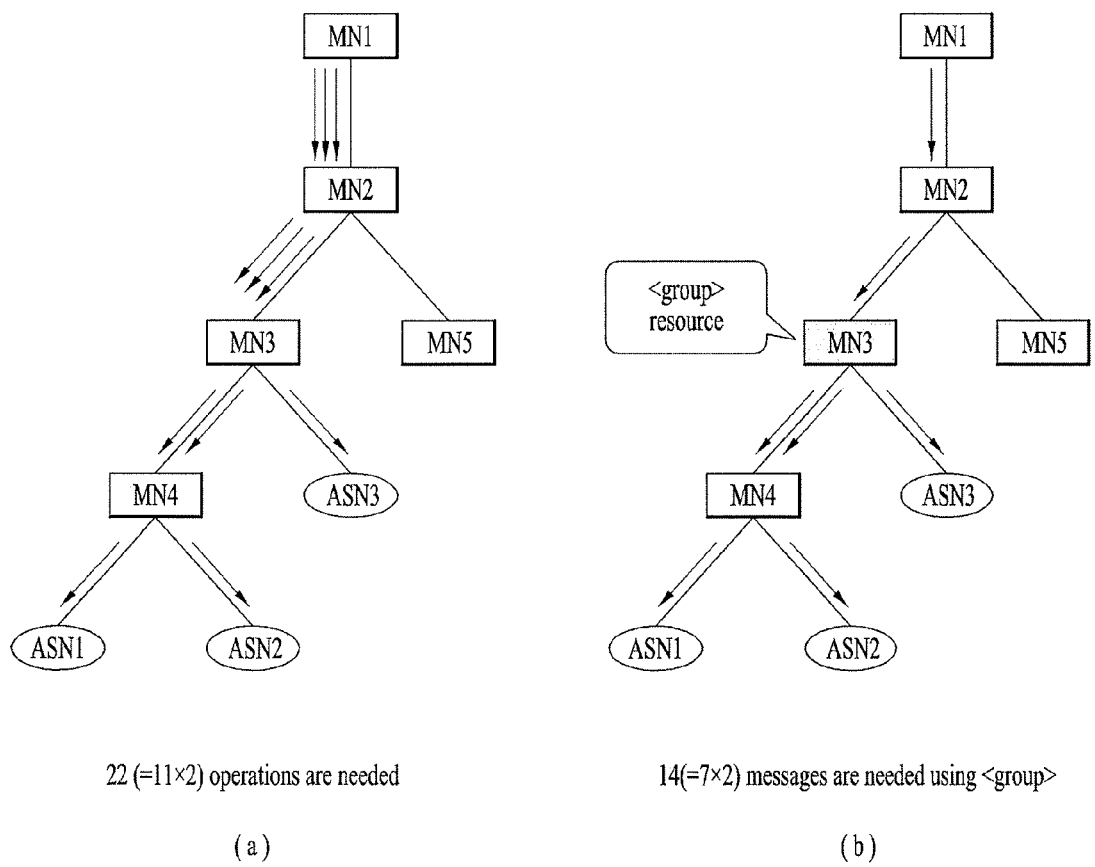
FIG. 6 illustrates an effect of a group resource for a group operation.

A group resource serves to perform a function related to a group operation. Using the group operation, an operation that is common to a plurality of resources can be efficiently performed by a one-time request. FIG. 6 illustrates an exemplary group operation using a <group> resource. (a) and (b) of FIG. 6 illustrate common operations of reading the value of a <container> resource in ASN1, ASN2, and ASN3. (a) of FIG. 6 illustrates an operation performed without a <group> resource. To this end, MN1 should transmit separate requests to ASN1, ASN2, and ASN3. In this case, a total of 11 request message transmissions needs to be performed and, in consideration of responses thereto, a total of 22 request and response message transmissions needs to be performed. In the figure, one arrow denotes one request message.

(b) of FIG. 6 illustrates an example using the <group> resource. The <group> resource is present in MN3 and has ASN1, ASN2, and ASN3 as members. If MN1 transmits one request message to the <group> resource of MN3, MN3 transmits the same request message to ASN1, ASN2, and ASN3 which are the members of the <group> resource, receives responses to the request message, aggregates the responses, and transmits the aggregated responses to MN1 at one time. In this way, when the <group> resource is used, 14 message transmissions including request and response messages need to be performed, which is very efficient.

The following table describes main attributes of the <group> resource.

TABLE 1

| Attributes of <group> | Multiplicity | RW/RO/WO | Description |
| --- | --- | --- | --- |
| memberType | 1 | WO | The resource type of member resources of a group if all member resources (including the member resources in any sub-groups) are of the same type. Otherwise, a type of 'mixed'. |
| currentNrOfMembers | 1 | RO | Current number of members in a group. Shall not be larger than maxNrOfMembers. |
| maxNrOfMembers | 1 | RW | Maximum number of members in a group. |
| membersList | 1 | RW | List of zero or more member URIs referred to in the remaining of this specification as memberID. Each URI (memberID) should refer to a member resource or a (sub-) group resource of a group. |
| membersAccessControlPolicyIDs | 0 . . . 1 (L) | RW | List of URIs of <accessControlPolicy> resources defining who is allowed to access <fanOutPoint> resource. |
| memberTypeValidated | 1 | RO | Indicate that memberType of all member resources of s group has been validated. |
| consistencyStrategy | 0 . . . 1 | WO | Determine how to deal with resources of a group if memberType validation fails. Delete an inconsistent member if this attribute is ABANDON_MEMBER; delete a group if this attribute is ABANDON_GROUP; and set memberType to "mixed" if this attribute is SET_MIXED. |
| groupName | 0 . . . 1 | RW | Name of the <group>. |

A <fanOutPoint> resource, which is a main child resource of a <group> resource, will be described below. The <fanOutPoint> resource is a virtual resource that does not include an attribute or a child resource. If a create, retrieve, update, or delete (CRUD) command is transmitted to the <fanOutPoint> resource, the <fanOutPoint> resource is particularly interpreted. In more detail, upon receiving a request for the <fanOutPoint> resource, a CSE having the <group> resource transmits the request to each member of the <group> resource which is parents of <fanOutPoint>. This is called fan-out and a message transmitted to each member of the <group> resource is referred to as a fanned-out message. A member that has received the request transmits a response to the CSE having the <group> resource. The CSE collects and aggregates responses and transmits the aggregated responses to an originator that has transmitted the command to a <group>/<fanOutPoint> resource.

Figure 7:
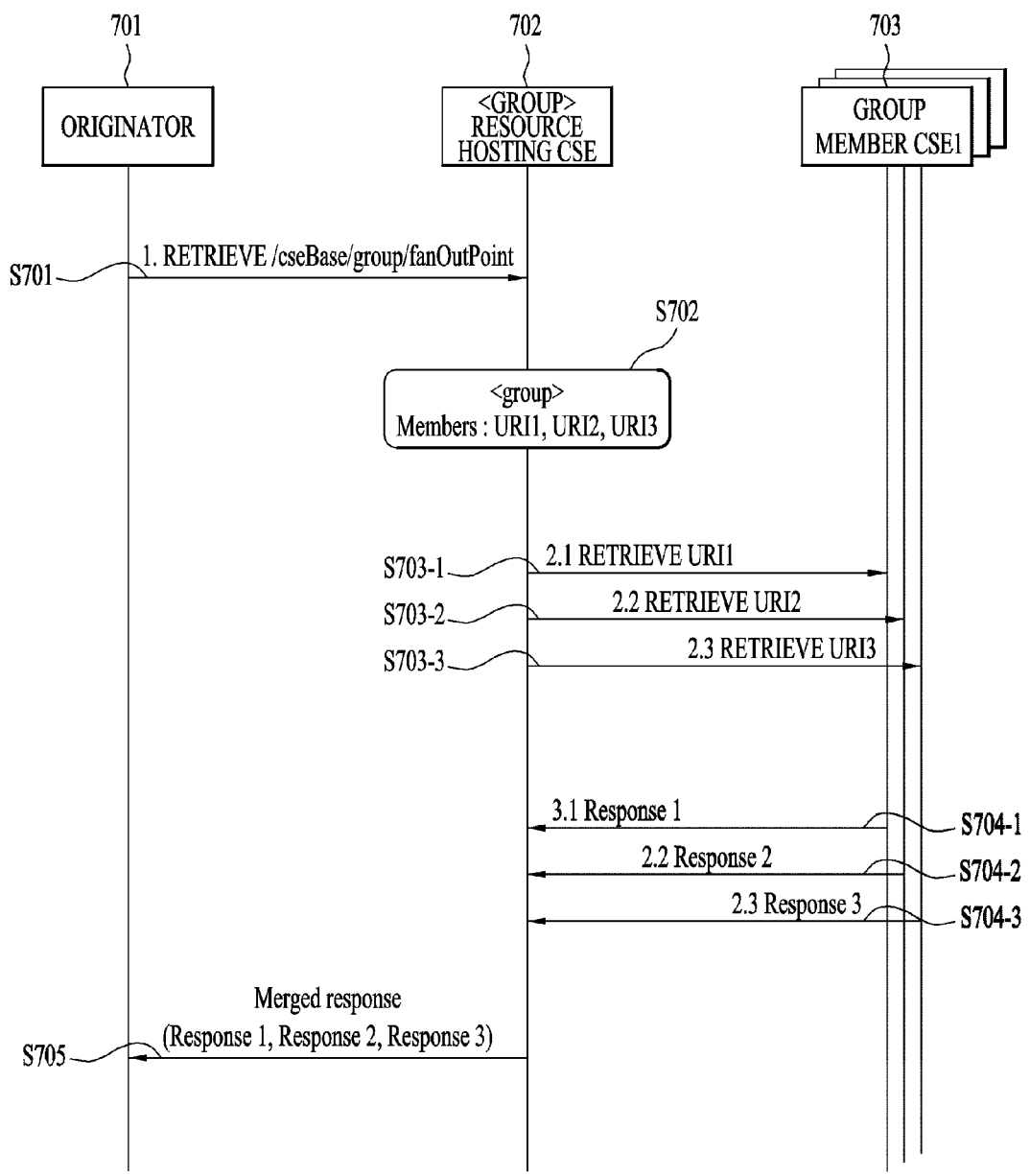
FIG. 7 illustrates a detailed procedure of the group operation illustrated in FIG. 6.

FIG. 7 illustrates in detail such a group operation.

S701: An originator 701 transmits a request to a <group> hosting CSE 702 having a <group> resource. This request may be permitted as long as it is any one of CRUD requests and should be transmitted to <fanOutPoint>, which is a child resource of the <group> resource, in a sense that the request is for fan-out rather than for the <group> resource. That is, if a Retrieve request is transmitted to the <group> resource, the request is not fanned out and is interpreted as a request for retrieving the <group> resource. If a specific request is transmitted to <fanOutPoint> under the <group> resource, this request is interpreted as being fanned out to all members included in the <group> resource. In an embodiment relating to FIG. 7, a GET command is transmitted to <fanOutPoint> for fan-out. That is, the originator transmits the Retrieve command for retrieving /cseBase/group/fanOutPoint to the group hosting CSE 702.

S702: The <group> hosting CSE 702 checks members of the <group>. In this example, it is assumed that the members of the <group> are URI1, URI2, and URI3.

S703: upon receiving the GET request in S701, the <group> hosting CSE 702 fans out the Retrieve request to all members (i.e. URI1, URI2, and URI3) included in the <group> resource. In this case, the <group> hosting CSE 702 transmits, as an originator, the request to the members. Accordingly, the <group> hosting CSE 702 transmits the request received from the originator 701 to URIs enumerated as the members. In this example, the <group> hosting CSE 702 transmits a Retrieve URI1 command to a CSE having a resource indicated by URI1 and transmits the Retrieve command even with respect to URI2 and URI3.

S704: The <group> hosting CSE 702 receives responses to the requests transmitted in S703 to the respective members.

S705: The <group> hosting CSE 702 aggregates the received responses and transmits one response message to the originator.

Figure 8:
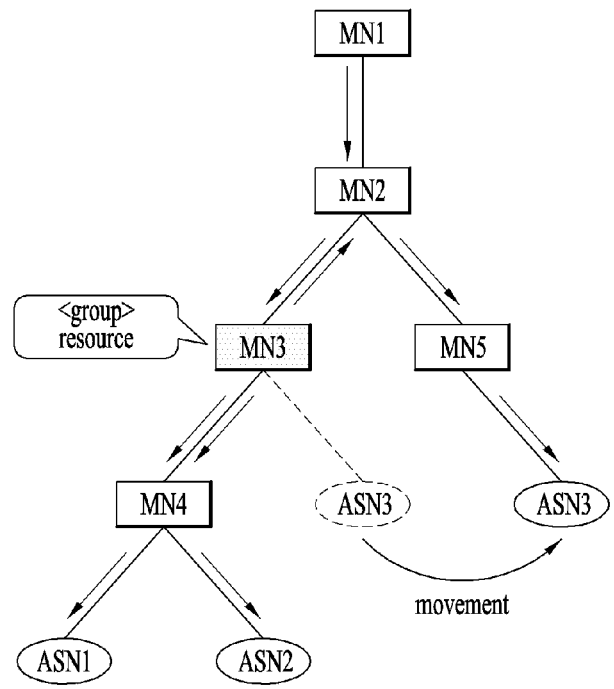
FIG. 8 illustrates problems of a conventional group operation.

Such a prior art has a problem of being incapable of efficiently performing a group operation when a device having a member resource moves to another place due to mobility. FIG. 8 illustrates an example of the problems.

In FIG. 8, ASN3 has originally been registered in MN3. In this case, 14 (=7×2) message transmissions including request and response message transmissions have been used for a group operation. However, if ASN3 moves and is registered in MN5, the group operation requires 18 (=9×2) message transmissions. Inefficiency of the group operation due to movement of a member may be pointed out as a problem of a legacy group operation. That is, the legacy group operation has not considered movement of a corresponding device. Therefore, improvement of the group operation caused by movement of a specific device is needed.

According to an embodiment of the present invention, there is provided a method capable of performing an efficient group operation by re-distributing a <group> resource when a group member is registered in another MN due to mobility. To this end, one <group> resource may be split into two <group> resources and a plurality of <group> resources may be merged into one.

Figure 9:
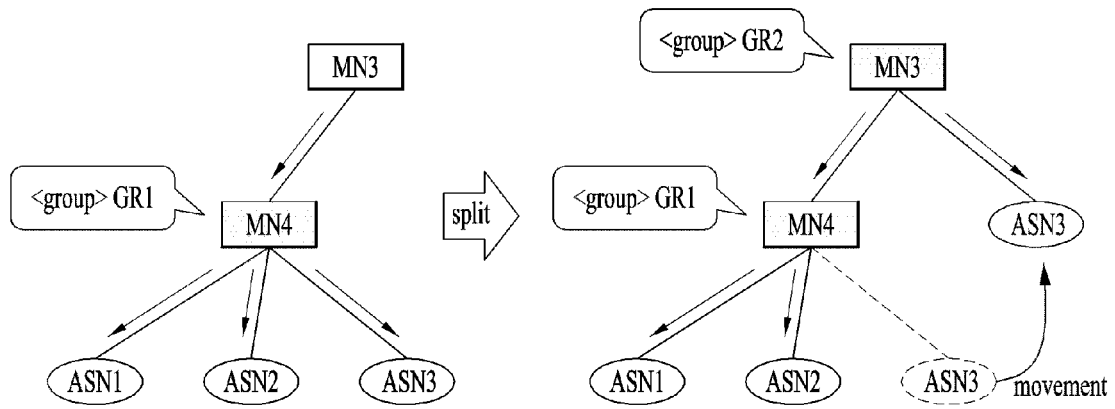
FIG. 9 illustrates a group re-distribution method according to an embodiment of the present invention.

FIG. 9 is a diagram for explaining split of a <group> resource. In a left figure, only MN4 has the <group> resource and this <group> resource is referred to as GR1.

GR1 has ASN1, ASN2, and ASN3 as members. If ASN3 moves and then is registered in MN3, a group operation becomes inefficient as described earlier. Therefore, if a partial member of GR1 that has been registered in MN4 is separated as a member of GR2, a more efficient group operation may be performed. The right side of FIG. 9 illustrates such an example. GR2 includes only ASN3 as a member and GR1 includes ASN1 and ASN2 as members.

Re-distribution of the group resource illustrated in FIG. 9 is re-distribution in an upward direction in an M2M environment of a hierarchical structure and is referred to as group-upward re-distribution. Such group-upward re-distribution will now be described in more detail.

In the present invention, the following two assumptions are made.

Nodes constituting an M2M network are hierarchically distributed according to a tree structure. That is, one node may be registered only in another single node.

A group operation is triggered from an upper entity only to a lower entity of a hierarchical tree structure. However, a fanned-out message generated due to the group operation may be propagated to the higher part of the hierarchical tree structure.

Figure 10:
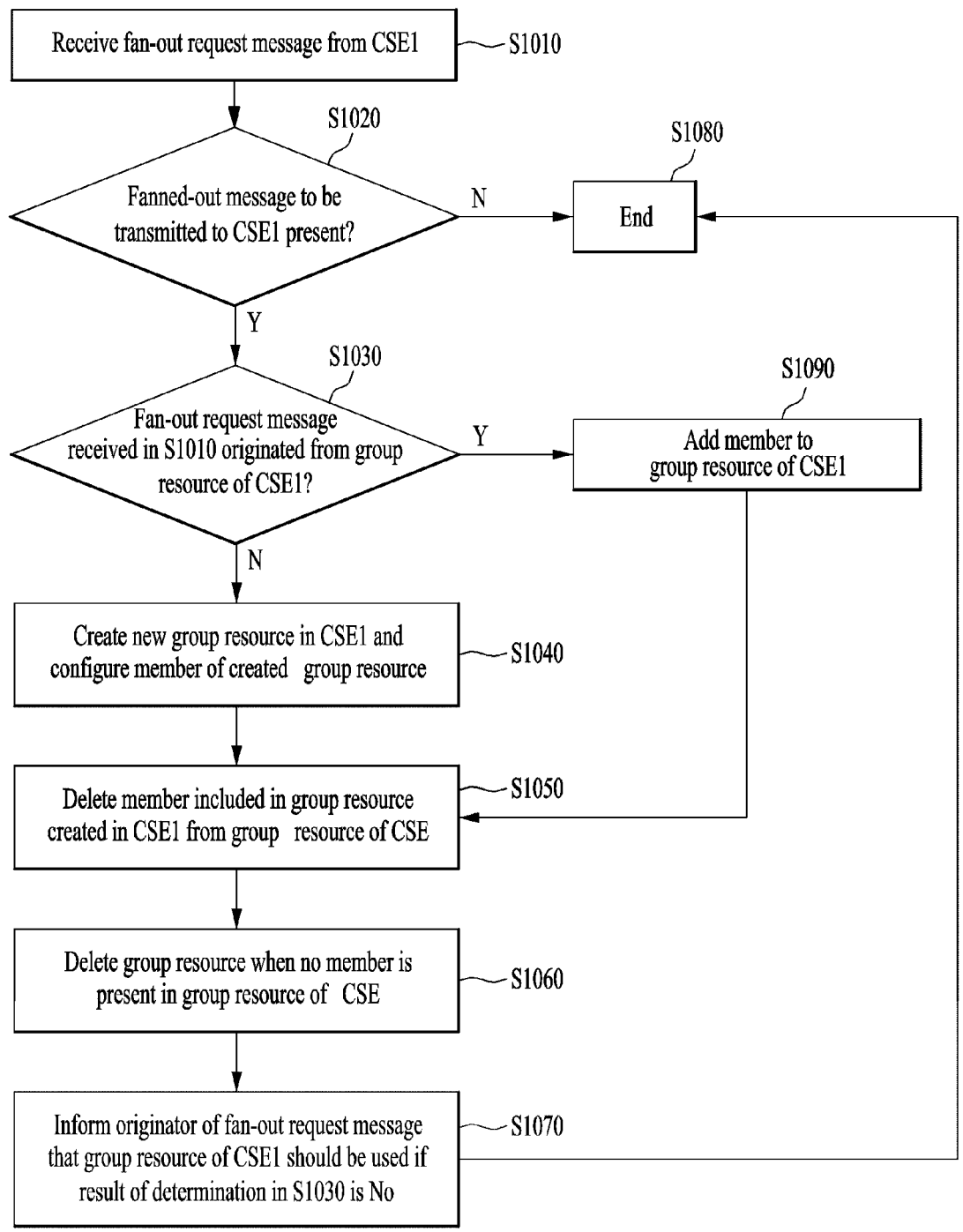
FIG. 10 illustrates a procedure of group-upward re-distribution according to an embodiment of the present invention.

FIG. 10 illustrates a procedure of group-upward re-distribution according to an embodiment of the present invention.

S1010: A CSE receives a fan-out request message from CSE1. CSE1 may be a previous hop in terms of the CSE. The CSE is a <group> resource hosting CSE. CSE1 may not be an originator of the fan-out request message and may be a middle transit CSE. The fan-out request message, which is a request for fan-out, should be a request for <fanOutPoint> which is a child resource of a <group> resource that the CSE includes.

S1020: After receiving the fan-out request message for a specific <group> resource from CSE1, the CSE transmits a fanned-out message to members of the <group> resource. In this case, the CSE checks whether there is a fanned-out message to be transmitted back to CSE1. This step serves to confirm whether at least one of the members has moved upward in a hierarchical resource structure. If there is movement in an upward direction, an efficient group operation can be performed by shifting a member (referred to as MD of the <group> resource at which the fanned-out message is targeted to CSE1. That is, the CSE may determine whether it is necessary to shift at least one member of the specific <group> resource to a member of a <group> resource of another M2M device (e.g. CSE1).

Accordingly, if there is no fanned-out message transmitted from the CSE to CSE1 or if it is not necessary to shift at least one member of the specific <group> resource to the member of the <group> resource of another M2M device, this embodiment is ended. If there is a fanned-out message transmitted from the CSE to CSE1 or if it is necessary to shift at least one member of the specific <group> resource to the member of the <group> resource of another M2M device, this embodiment proceeds to step S1030.

S1030: The member M1 of a <group> of the CSE at which the fanned-out message confirmed in step S1020 is targeted should move to CSE1. In this case, this step serves to determine whether to create a new <group> resource in CSE1 or add, as a member, the member M1 to an existing <group> resource processed by CSE1. This step serves to check whether a <group> resource for CSE1 is present in CSE1.

If the fan-out request message received in step S1010 originates from the <group> resource of CSE1 (i.e.

<group>/<fanOutPoint> of the CSE is added as a member to the <group> resource of CSE1), M1 only needs to be added as the member to the <group> resource of CSE1.

S1040: If the <group> resource for adding M1 as a member is not present in CSE1, the CSE newly creates the <group> resource in CSE1 and adds, as a member of CSE1, M1 (a target of the fanned-out message transmitted to CSE1 determined in S1020). In addition, the CSE adds, as the member of the <group> of CSE1, <fanOutPoint> (a <fanOutPoint> resource targeted by the fan-out request in S1010) of the group thereof. This serves to transmit the fanned-out response message again to the <group> resource of the CSE when the fanned-out request message is transmitted to the <group> resource newly created in CSE1.

S1050: The CSE deletes M1 from the <group> resource thereof. Therefore, M1 has moved to the <group> of CSE1 from the <group> of the CSE.

S1060: The CSE deletes the <group> resource thereof when there are no more members in the <group> resource thereof.

S1070: If a result of determination in S1030 is No, the CSE informs an originator that the <group> resource of CSE1 should be used. If the originator has performed a group operation using the <group> of the CSE, the originator needs to perform the group operation using the <group> of CSE1. If the determination result is Yes in S1030, since this means that the originator has already used, for the group operation, another <group> having CSE1 or the <group> of CSE1 as a member, the CSE does not need to inform the originator of group use.

S1080: If there is no fanned-out message transmitted again to CSE1 in S1020, group re-distribution does not occur and this embodiment is ended upon completion of S1090.

S1090: The CSE adds the member M1 to the <group> resource of CSE1.

Figure 11:
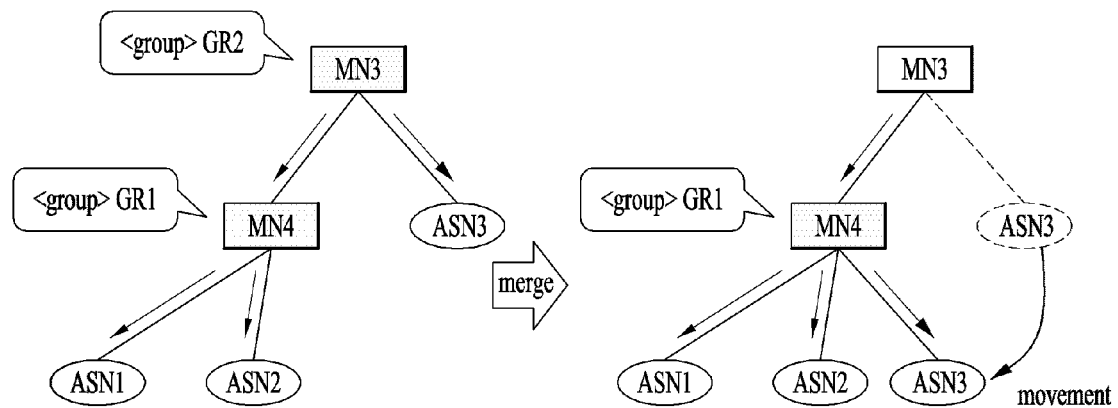
FIG. 11 illustrates a group re-distribution method according to an embodiment of the present invention.

FIG. 11 is a view for explaining merging of <group> resources. A situation of FIG. 11 is the reverse of that of FIG. 9. ASN3 that has been registered in MN3 moves and is registered again in MN4. This represents an example of merging GR2 into GR1 for efficient group operation. REdistribution of group resources illustrated in FIG. 11 is re-distribution in a downward direction in an M2M environment of a hierarchical structure and is referred to as group-downward re-distribution. Group-downward re-distribution will be described below in more detail.

Figure 12:
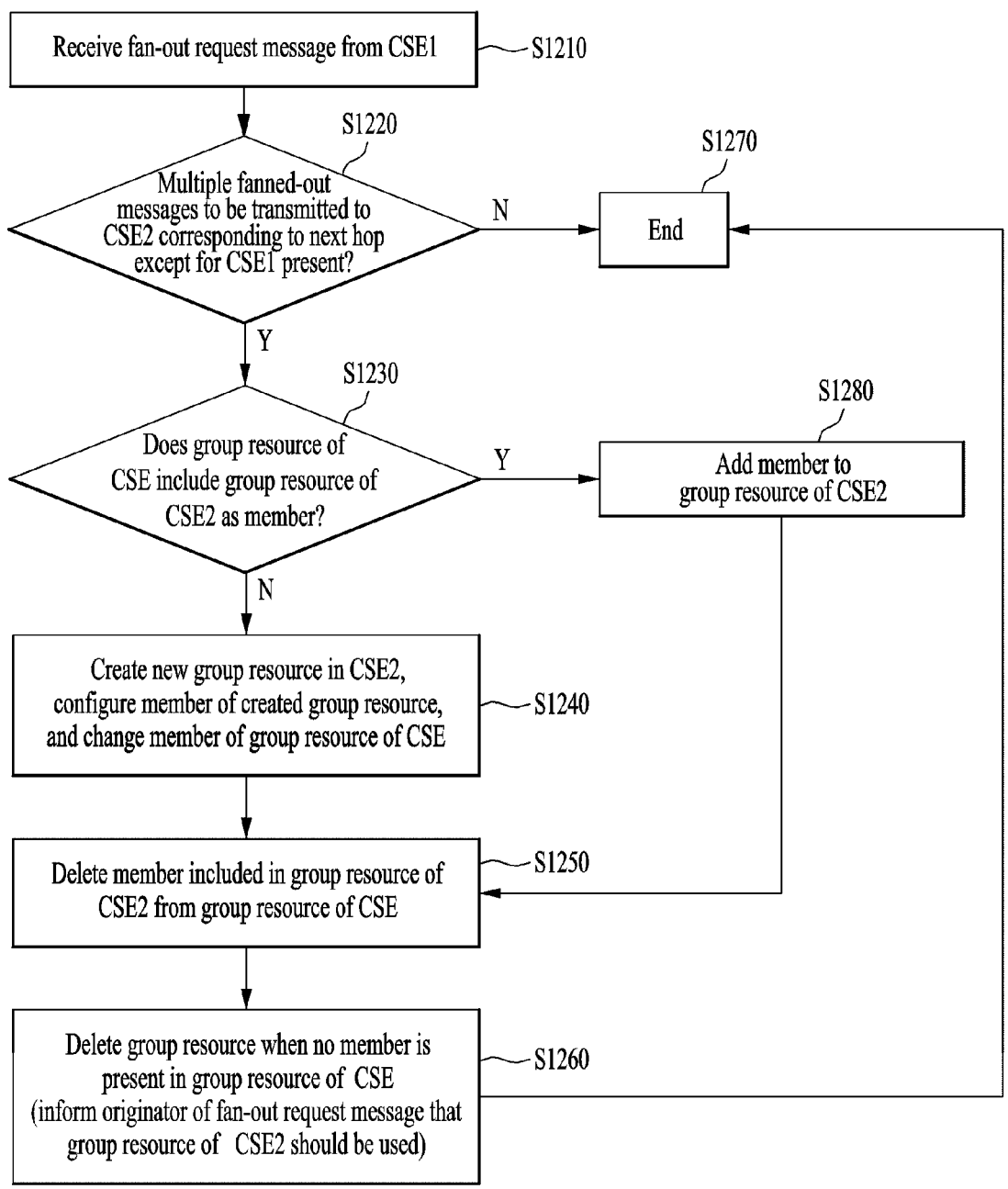
FIG. 12 illustrates a procedure for re-distributing a group according to an embodiment of the present invention.

For a detailed description of a procedure relating to FIG. 11, reference will now be made to FIG. 12.

S1210: A CSE receives a fan-out request message of the same type as in FIG. 10.

S1220: If a fanned-out message is transmitted as a result of the fan-out request message received in S1210, the CSE checks whether a plurality of fanned-out messages is transmitted to the same next hop CSE2. That is, the meaning that there are two or more fanned-out messages that have been transmitted or are to be transmitted to the same next hop may indicate that node(s) that have been registered in the CSE move and then are registered in CSE2. If so, one group of the fanned-out messages may be created in the next hop CSE2 to perform an efficient group operation. CSE1 is excluded from the next hop of the CSE because transmission of the fanned-out message to CSE1 can be replaced with the embodiment described with reference to FIGS. 9 and 10. That is, the CSE may determine whether it is necessary to shift at least one member of the specific <group> resource to a member of a <group> resource of another M2M device (e.g. CSE2).

S1230: If there is a plurality of fanned-out messages to be transmitted to the same next hop CSE2 in step S1220 or if it is necessary to shift at least one member of the specific <group> resource to the member of the <group> resource of another M2M device (e.g. CSE2), a target (i.e. ASN3 in FIG. 11) of the fanned-out messages only needs to move to a <group> resource of CSE2. In this step, the CSE determines whether to create a new <group> resource in CSE2 or to be able to use an existing <group> resource of CSE2. To this end, the CSE checks whether a <group> resource thereof that has received the fan-out request message in S1210 includes the <group> resource of CSE2 as a member.

S1240: If the <group> resource of the CSE does not include the <group> resource of CSE2 as a member, the CSE should create a new <group> resource as a member in CSE2. The CSE adds the target of the fanned-out messages transmitted to CSE2 as a member of the newly created <group> resource of CSE2. In addition, the CSE adds the <group> resource of CSE2 to the <group> resource thereof as a member (accurately, adds a <group>/<fanOutPoint> resource of CSE2 as a member).

S1250: The CSE deletes a member included in <group> of CSE2 from the <group> resource thereof. Thus, the member included in the <group> of the CSE moves to the <group> of CSE2.

S1260: If a member is no longer present in the <group> resource of the CSE, the CSE deletes the <group> resource thereof. Upon deletion, the CSE informs an originator that the <group> resource of CSE2 should be used.

S1270: If a plurality of fanned-out messages is not transmitted to the same next hop in S1220 or if it is not necessary to shift at least one member of the specific <group> resource to the member of a <group> resource of another M2M device (e.g. CSE2), group re-distribution does not occur and the embodiment of the present invention is ended.

S1280: In this step, the <group> resource of CSE2 may be used to shift a member of CSE to CSE2 in S1230. That is, since the group resource of the CSE includes <group>/<fanOutPoint> of CSE2 as a member, the CSE adds a target (i.e. ASN3 of FIG. 11) of the fanned-out messages transmitted to the <group> resource of CSE2.

Figure 13:
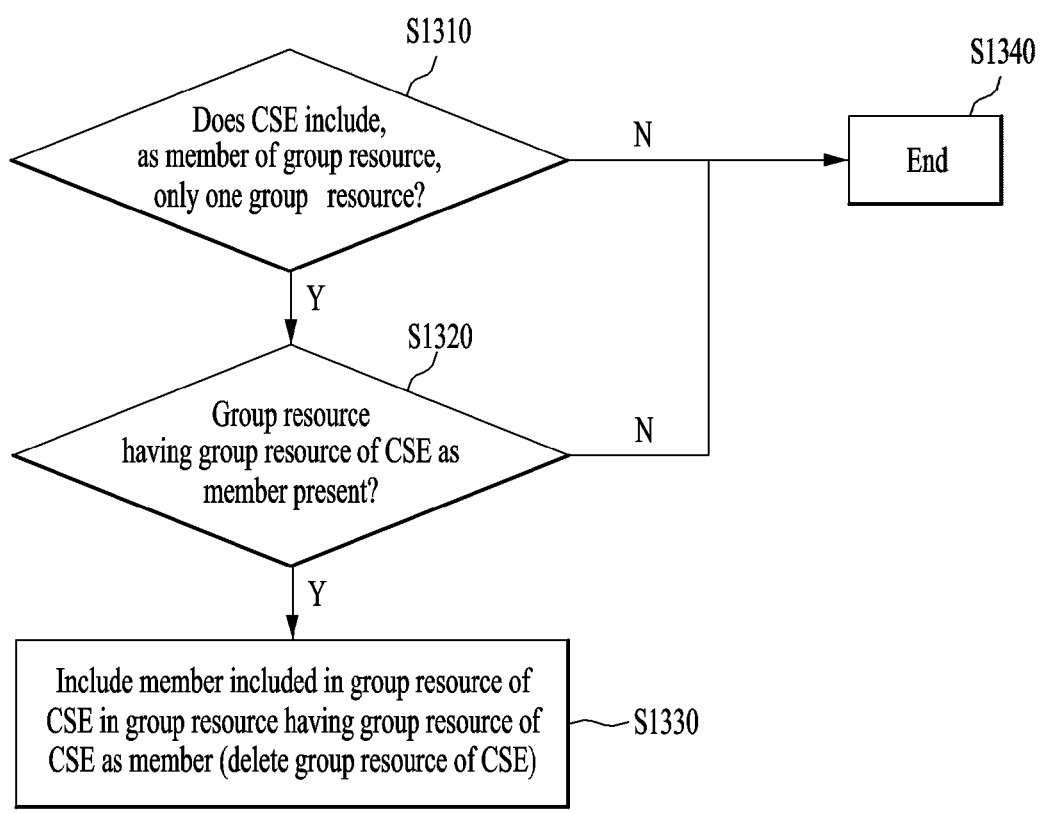
FIG. 13 illustrates a procedure for deleting a group according to an embodiment of the present invention.

FIG. 13 illustrates a procedure for deleting a group according to an embodiment of the present invention. This embodiment may be performed when a CSE having a <group> resource is periodically generated or performs a group operation.

S1310: A CSE checks whether only one <group> resource (referred to as GR1) is present as a member of a <group> resource thereof.

S1320: The CSE checks whether a <group> resource (referred to as GR2) having the <group> resource thereof as a member is present. This <group> resource may be present in another CSE.

S1330: This step is performed when both S1310 and S1320 are satisfied. The CSE shifts GR1 to a member of GR2. Then, the CSE deletes the <group> resource thereof.

S1340: This step is performed when either S1310 or S1320 is not satisfied and serves to end a procedure because there is no unnecessary <group> resource.

Figure 14:
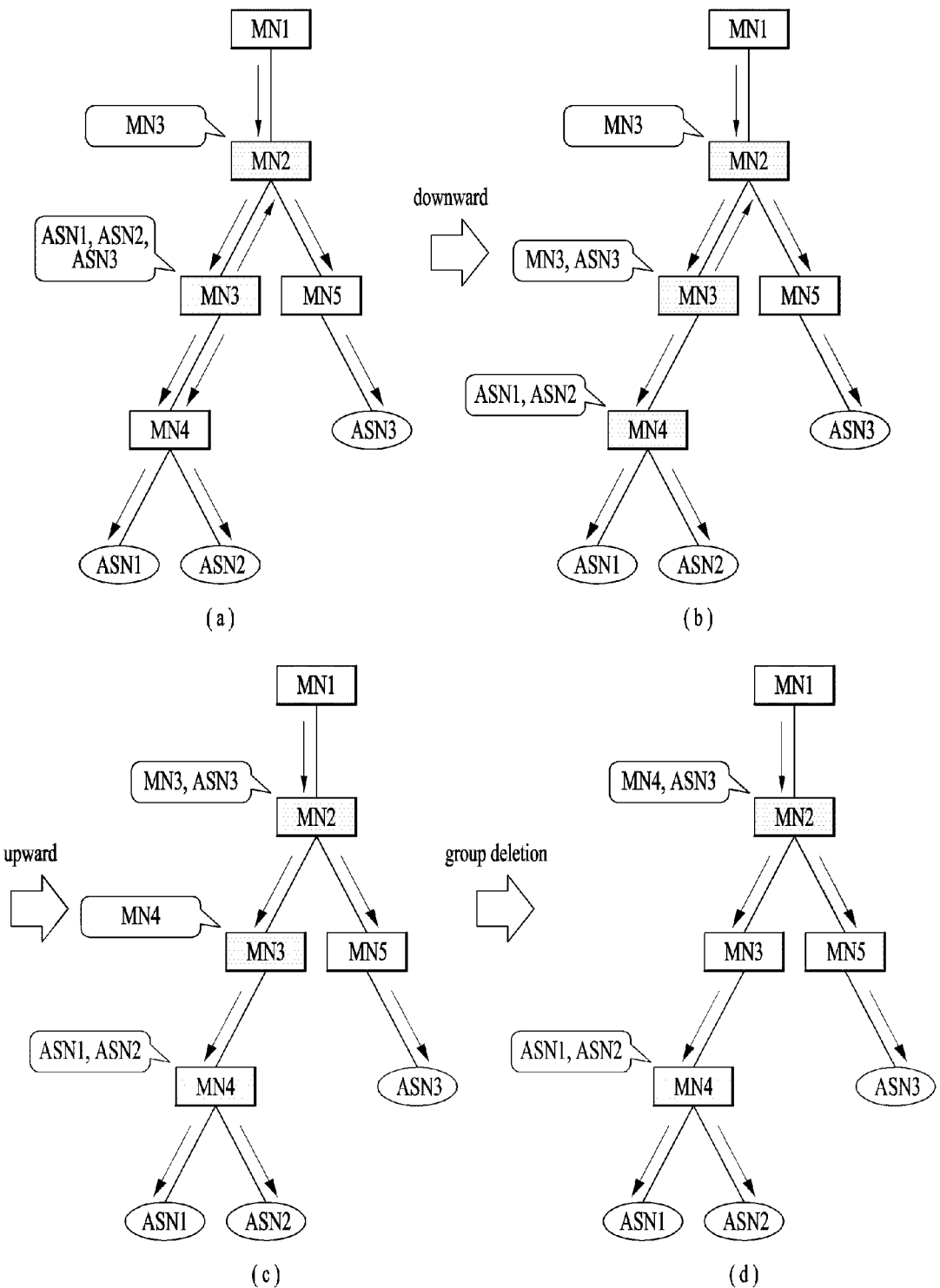
FIG. 14 illustrates an example in which the embodiments described with reference to FIGS. 9 to 13 are combined.

FIG. 14 illustrates an example of re-distributing a <group> resource using the embodiments described with reference to FIGS. 9 to 13.

(a) of FIG. 14 illustrates initial group distribution. MN2 and MN3 indicated as a shaded part are nodes including the <group> resource. MN2 includes MN3 as a member and MN3 includes ASN1, ASN2, and ASN3 as members.

(b) of FIG. 14 illustrates a result of group re-distribution using group-downward re-distribution. In (a) of FIG. 14, if a fan-out request is transmitted from MN1 to MN2, the fan-out request is transmitted to MN3. Since a plurality of fanned-out messages is transmitted from MN3 to MN4 (next hop), the <group> resource is created in MN4 and ASN1 and ASN2 become members of MN4. MN3 includes MN4 as a new member and deletes ASN1 and ASN2 from the members (refer to FIG. 12).

(c) of FIG. 14 illustrates a result of group re-distribution using group-upward re-distribution. Since a fanned-out message is transmitted from MN3 again to MN2 in (b) of FIG. 14 and this message is targeted at ASN3, ASN3 is shifted to a member of a group of MN2 (refer to FIG. 10).

(d) of FIG. 14 illustrates a result of group re-distribution using unnecessary group deletion. Since MN3 includes only one other group as a member in (c) of FIG. 14 and there is another group MN2 having MN3 as a member, MN4 is added to MN2 and the group included in MN3 is deleted.

In the description of FIG. 14, change from (a) to (b) of FIG. 14 and from (b) to (c) of FIG. 14 is not limited to an illustrated order. That is, group-upward re-distribution or group-downward re-distribution may be performed in an arbitrary order.

While an efficient group operation cannot be performed when a member resource belonging to the group resource moves to another place due to mobility, the embodiments of the present invention can perform an efficient group operation by autonomously re-distributing a <group> resource between CSEs.

Meanwhile, since the CSE described in association with FIGS. 9 to 14 is an entity that can be present in an M2M device, an M2M gateway, or an M2M server, it is apparent to those skilled in the art that the CSE may be referred to as the M2M device, the M2M gateway, or the M2M server. In addition, since the MN is an entity that can be present in the M2M gateway, it is apparent to those skilled in the art that MN may be referred to as the M2M gateway (device or server).

Figure 15:
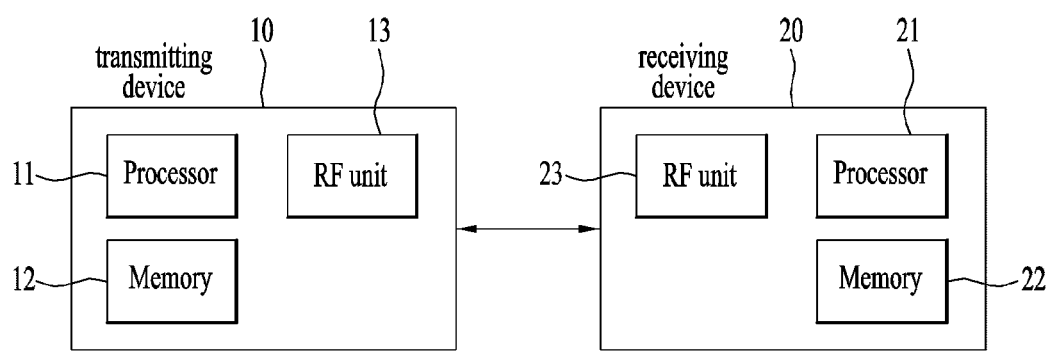
FIG. 15 is a block diagram of devices for implementing embodiment(s) of the present invention.

FIG. 15 is a block diagram of a transmitting device 10 and a receiving device 20 configured to implement exemplary embodiments of the present invention. Referring to FIG. 15, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, an application (entity) or a resource-related entity may be operated as a device in which the entity is installed or mounted, i.e., as a transmission device 10 or a reception device 20.

A detailed configuration of the application (entity) or the resource-related entity as the reception device or the transmission device may be implemented such that the contents described in various embodiments of the present invention in association with the figures are independently applied or two or more embodiments are simultaneously applied.

An M2M device configured to transmit a message in a wireless communication system according to an embodiment of the present invention may include an RF unit and a processor configured to control the RF unit.

The processor may be configured to receive a specific request message for a first group resource from a first M2M device, check whether it is necessary to shift at least one member of the first group resource to a member of a group resource of a specific M2M device, determine whether to use an existing group resource present in the specific M2M device or to create a new group resource in the specific M2M device in order to shift the at least one member to the member of the group resource of the specific M2M device, and if it is determined to create the new group resource in the specific M2M device, add the at least one member to the new group resource as a member.

If the specific M2M device resides at a higher location relative to the M2M device in a hierarchical tree structure, the processor may be configured to add the first group resource to the new group resource as a member, and if the specific M2M device resides at a lower location relative to the M2M device in the hierarchical tree structure, the processor may be configured to add the new group resource to the first group resource as a member.

The specific request message may be targeted at a fan-out resource residing at a lower location of the first group resource.

If it is determined to use the existing group resource present in the specific M2M device, the processor may be configured to add the at least one member to the existing group resource.

The processor may be configured to determine whether a message to be transmitted as a result of the specific request message is transmitted to the first M2M device or a plurality of messages to be transmitted as a result of the specific request message is transmitted to the same M2M device among M2M devices except for the second M2M device in order to determine whether it is necessary to shift the at least one member to the member of the group resource of the specific M2M device.

The processor may be configured to check whether the specific request message originates from a group resource of the first M2M device or whether the first group resource includes the group resource of the specific M2M device as a member in order to determine whether to use the existing group resource present in the specific M2M device or to create the new group resource in the specific M2M device.

The processor may be configured to delete the at least one member from the first group resource.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method of re-distributing a group resource of machine-to-machine (M2M) devices arranged based on a hierarchical tree structure by a first M2M device having a first group resource, the method comprising:
   receiving, by the first M2M device, a request message for the first group resource from a second M2M device;
   adding, by the first M2M device, at least one member of the first group resource to a new group resource as a member when it is determined that the new group resource needs to be created in another M2M device in order to shift the at least one member to the member of the group resource of the another M2M device;
   adding, by the first M2M device, the first group resource to the new group resource as a member if the another M2M device is positioned at a higher location relative to the first M2M device in the hierarchical tree structure; and
   adding, by the first M2M device, the new group resource to the first group resource as a member when the another M2M device is positioned at a lower location relative to the first M2M device in the hierarchical tree structure.

2. The method according to claim 1, wherein the request message is targeted at a fan-out resource residing at a lower location of the first group resource.

3. The method according to claim 1, further comprising adding the at least one member to an existing group resource present in the another M2M device upon determining to use the existing group resource present in the another M2M device.

4. The method according to claim 1, wherein it is checked that the at least one member of the first group resource needs to be shifted if a message to be transmitted as a result of the request message is transmitted to the second M2M device or a plurality of messages to be transmitted as a result of the request message is transmitted to an M2M device among M2M devices except for the second M2M device.

5. The method according to claim 1, wherein the new group resource is created if it is checked that the request message does not originate from a group resource of the second M2M device or the first group resource does not include the group resource of the another M2M device as a member.

6. The method according to claim 1, further comprising deleting the at least one member from the first group resource.

7. A machine-to-machine (M2M) device configured to re-distribute a group resource in a wireless communication system including M2M devices arranged based on a hierarchical tree structure, the M2M device having a first group resource and comprising:
   a receiver and a transmitter; and a processor that controls the receiver and the transmitter,
   wherein the processor:
      controls the receiver to receive a request message for the first group resource from a first M2M device,
      adds at least one member of the first group to a new group resource as a member when it is determined that the new group resource needs to be created in a specific M2M device in order to shift the at least one member to the member of the group resource of the specific M2M device,
      adds the first group resource to the new group resource as a member when the specific M2M device is positioned at a higher location relative to the M2M device in the hierarchical tree structure, and
      adds the new group resource to the first group resource as a member when the specific M2M device is positioned at a lower location relative to the M2M device in the hierarchical tree structure.

8. The M2M device according to claim 7, wherein the request message is targeted at a fan-out resource residing at a lower location of the first group resource.

9. The M2M device according to claim 7, wherein the processor adds the at least one member to an existing group resource present in the specific M2M device upon determining to use the existing group resource present in the specific M2M device.

10. The M2M device according to claim 7, wherein it is checked that the at least one member of the first group resource needs to be shifted if a message to be transmitted as a result of the request message is transmitted to the first M2M device or a plurality of messages to be transmitted as a result of the request message is transmitted to an M2M device among M2M devices except for the first M2M device.

11. The M2M device according to claim 7, wherein the new group resource is created if it is checked that the request message does not originate from a group resource of the first M2M device or the first group resource does not include the group resource of the specific M2M device as a member.

12. The M2M device according to claim 10, wherein the processor deletes the at least one member from the first group resource.

* * * * *